(12) United States Patent
Cutler et al.

(10) Patent No.: US 12,433,240 B2
(45) Date of Patent: Oct. 7, 2025

(54) ANIMAL TRANSPORTATION BAG

(71) Applicants: Andrew K. Cutler, St. Anthony, ID (US); Kyle R. McClintock, Granite Bay, CA (US)

(72) Inventors: Andrew K. Cutler, St. Anthony, ID (US); Kyle R. McClintock, Granite Bay, CA (US)

( * ) Notice: Subject to any disclaimer, the term of this patent is extended or adjusted under 35 U.S.C. 154(b) by 38 days.

(21) Appl. No.: 17/978,373

(22) Filed: Nov. 1, 2022

(65) Prior Publication Data
US 2023/0270075 A1 Aug. 31, 2023

Related U.S. Application Data

(60) Provisional application No. 63/313,784, filed on Feb. 25, 2022.

(51) Int. Cl.
*A01K 1/02* (2006.01)
*A01M 31/00* (2006.01)
*B65D 33/00* (2006.01)

(52) U.S. Cl.
CPC .......... *A01K 1/0254* (2013.01); *A01K 1/0272* (2013.01); *A01M 31/006* (2013.01); *B65D 33/00* (2013.01)

(58) Field of Classification Search
CPC . A01K 1/0254; A01K 1/0272; A01M 31/006; A22B 5/06; A22B 7/006; B62B 15/00; B62B 15/007; B62B 2202/42; B65D 33/00; Y10S 224/921
USPC .......................................................... 383/42
See application file for complete search history.

(56) References Cited

U.S. PATENT DOCUMENTS

| | | | | |
|---|---|---|---|---|
| 4,137,870 A | * | 2/1979 | Cano | A01K 13/006 119/416 |
| 5,467,907 A | * | 11/1995 | Celik | A45F 3/04 224/103 |
| 5,564,612 A | * | 10/1996 | Gregory | A45F 3/08 224/633 |
| 5,761,992 A | * | 6/1998 | Gallo | A01M 31/00 452/187 |
| 6,253,569 B1 | * | 7/2001 | Hall | A23G 9/44 62/457.2 |
| 7,832,743 B2 | * | 11/2010 | Small | A22B 5/06 5/628 |
| 7,954,503 B2 | * | 6/2011 | Glass | E04H 15/30 135/96 |
| 10,085,901 B1 | * | 10/2018 | Steinbock | B65D 33/06 |
| 10,617,096 B2 | * | 4/2020 | Watson | A45F 3/04 |
| 2020/0060222 A1 | * | 2/2020 | Watson | A01K 1/029 |
| 2021/0145188 A1 | * | 5/2021 | Thatcher | A45F 3/04 |

* cited by examiner

*Primary Examiner* — Nathan J Newhouse
*Assistant Examiner* — Matthew T Theis

(57) ABSTRACT

An animal transportation bag may include an outer covering including a base section, a front sidewall, a rear sidewall, a first sidewall, a second sidewall, a top section with a first panel and a second panel. The bag may include one or more handles on the front sidewall, the rear sidewall, the first side wall, and the second sidewall. The handles may be continuous from one side to the other, thereby creating additional strength. The first panel and second panel may couple to each other via a fastener. An opening on the bag may be sized to receive a neck of an animal. The bag has an inner compartment. On a lower surface of the inner compartment, there may be one or more straps to secure an animal to the bag.

17 Claims, 13 Drawing Sheets

ANIMAL TRANSPORTATION BAG

CROSS-REFERENCE TO RELATED APPLICATIONS

This application claims the benefit of U.S. Provisional Application Ser. No. 63/313,784, filed on Feb. 25, 2022, which is incorporated herein by reference.

TECHNICAL FIELD

The present disclosure relates to a bag to transport animals. More particularly, the present disclosure relates to a bag capable of receiving a dead or live animal so as to be transportable on a UTV, other type of vehicle, or by hand.

BACKGROUND

The pursuit of animals for food and sport has existed for years. Many people have hunted to provide food for their families and communities. Hunting traditions have been passed down for generations and are still important to many families and countries throughout the world. Transportation of big game animals, once they are down, can vary from person to person. For example, some may cut and quarter their animal and place it in a back pack, some may load the animal into a truck or SUV, and others may utilize a UTV or some combination thereof. When individuals transport these animals in a vehicle, such as a UTV, truck, or SUV, they will often place them in the vehicle without a tarp or other type of covering, which allows blood and hair to gather on and in the vehicle. Cleaning a vehicle with blood and hair may be difficult because by the time it can be washed off, it has collected dust and dried, creating an arduous, future cleaning process. In addition to the vehicle being dirty, the animal also becomes dirty due to the dust created from driving, which adds an additional step, cleaning the animal thoroughly, prior to butchering.

Attempts have been made to prevent messes from transporting animals in vehicles. However, these attempts still have numerous shortcomings. As an example, some people may try to wrap the animal in a tarp. While tarps may prevent some mess within a vehicle, they are cumbersome to use due to the excess material that is often hard to control, especially in the wind. Tarps also have large openings that allow blood and other debris to run and/or fall out. Alternatively, others may turn to game bags that receive quarters of an animal. These game bag may still leak and lead to messes within the vehicle, and because of their thin nature, debris or insects may adhere to the meat. Further, it can also be difficult to handle and maneuver meat or quarters of the animal within these bags. Tarps and game bags may also develop holes and are often only capable of being used once.

Accordingly, there is a need for a bag that contains an animal, prevents messes, and provides for easy transportation of the animal. The present invention seeks to solve these and other problems.

SUMMARY OF EXAMPLE EMBODIMENTS

In one embodiment, an animal transportation bag may comprise an outer covering including a base section, a front sidewall, a rear sidewall, a first sidewall, a second sidewall, a top section with a first panel and a second panel. The outer covering may comprise an outer surface. The outer covering may be in a variety of colors. The bag may include numerous handles on the front sidewall, the rear sidewall, the first side wall, and/or the second sidewall. In some embodiments, handles may be continuous from one side to the other, extending through or under the bag, thereby creating additional strength in the handles and allowing the bag to maintain structural integrity while transporting an animal. The first panel and second panel may couple to each other via a fastener. The fastener may begin to fasten at an opening positioned on the front sidewall. The fastener may also begin at other positions on the bag. The opening may be sized to receive a head and/or neck of an animal. The bag comprises an inner compartment having an inner surface. On a lower surface of the inner compartment, there may be one or more straps to secure the animal to the bag.

In one embodiment, a method of using an animal transportation bag comprises placing an animal in the inner compartment; securing the animal via one or more inner straps; placing the animal's neck in an opening; securing a fastener to bring a first panel and a second panel together; and transporting the animal via handles on the bag.

In one embodiment, an animal transportation bag comprises an outer covering. The outer covering may comprise a drain plug. The outer surface comprises a fastener, such as a zipper. The outer covering may comprise a neck portion that is shaped to mirror the anatomy of a big game animal, or any other type of animal. The neck portion may comprise an opening, where the antlers or head and neck may be exposed. The opening may be circumscribed by a drawstring with a toggle spring-stop that allows the opening to close. In addition, handles may pass through the bag to assist a user in lifting a heavy load. On a bottom side, there may be a plurality of first connections and a plurality of second connections. The plurality of first and second connections may receive a first support bar and a second support bar, respectively. The first and second support bars may add rigidity and support to the bag. In some embodiments, the first and second support bars may each receive a handle. In addition, in one embodiment, the first and second support bars may receive a hitch so as to be coupleable to a vehicle. The outer covering may also comprise a sleeve that is configured to receive an axle with wheels.

In one embodiment, an animal transportation bag comprises an outer covering. The outer covering may comprise a top section and a bottom section. The top section may comprise a fastener. The fastener may curve around a side of the top section. The outer covering may comprise a neck portion that is shaped to mirror the anatomy of a big game animal and extends outward from the top and bottom section. The neck portion may comprise an opening, where the antlers or head and neck may be exposed. The opening may be circumscribed by a drawstring with a toggle spring-stop. The drawstring allows a user to easily adjust the circumference size of the opening, thereby allowing numerous animal neck and head sizes to be placed therein.

In one embodiment, an animal transportation bag may comprise a front, a back, a top, a bottom, a first side, and a second side. The animal transportation bag may comprise a first layer and a second layer. The animal transportation bag may comprise a neck portion that leads to a body portion. The neck portion may comprise an opening that allows access to an interior compartment of the animal transportation bag. The opening of the animal transportation bag may be circumscribed by a first frame.

Further, the animal transportation bag may comprise one or more handles. The front of the animal transportation bag may comprise a window. The window may be covered by a window cover. The window cover may be removably attachable to the animal transportation bag. The front of the animal transportation bag may further comprise a first strap with a first fastener and a second strap with a second fastener. The back of the animal transportation bag may comprise a third strap with a third fastener and a fourth strap with a fourth fastener. The animal transportation bag may further comprise a second frame. The second frame may be positioned or wrap around the circumference of the animal transportation bag from the bottom to the top. The second frame may add rigidity to the animal transportation bag, thereby allowing the animal transportation bag to stand erect on its own. Due to the configuration of the second frame, the second frame may be collapsible, thereby allowing the top to contact and be secured to the bottom via, for example, a bag fastener.

DETAILED DESCRIPTION OF EXAMPLE EMBODIMENTS

Figure 1:
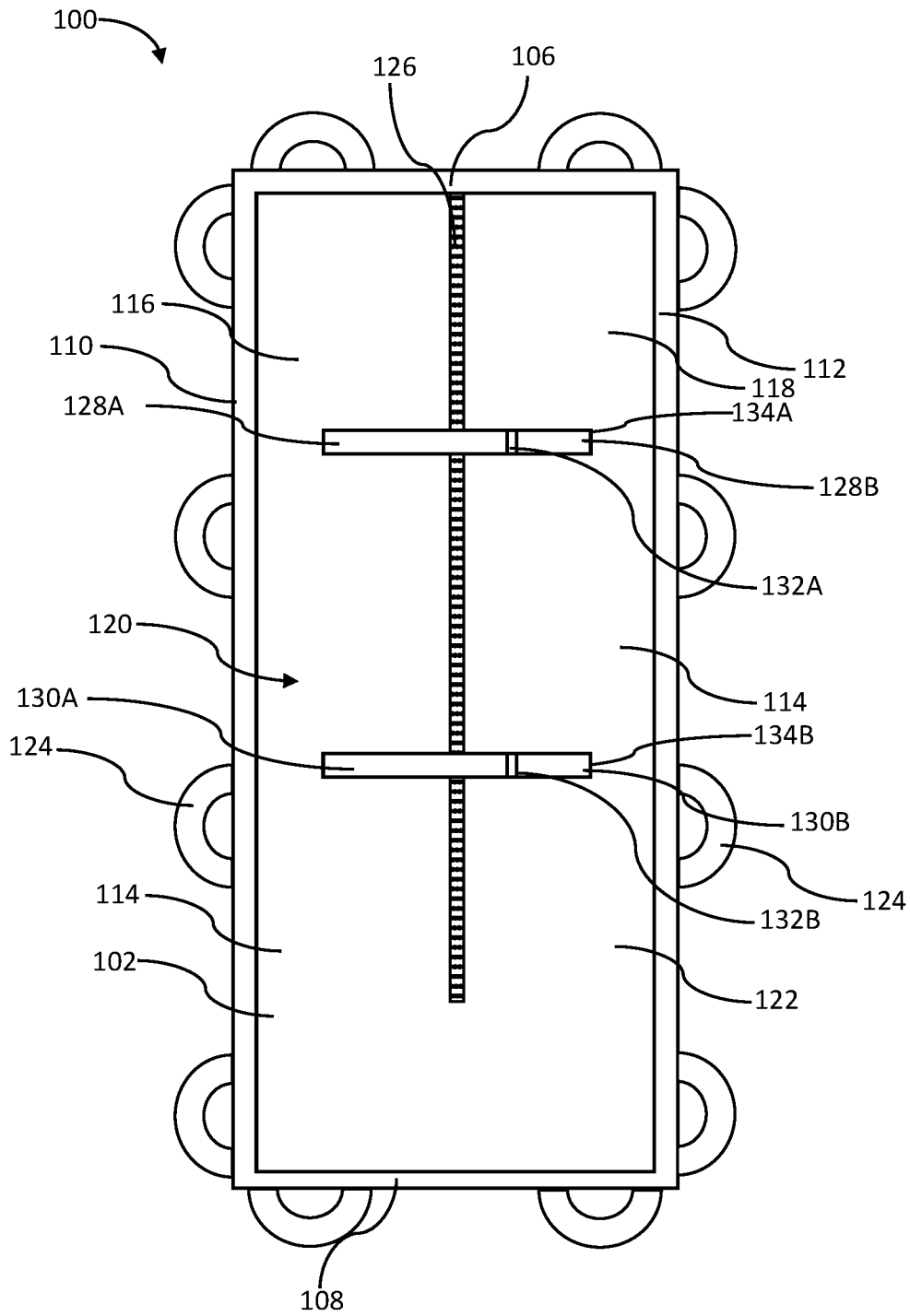
FIG. 1 illustrates a top plan view of an animal transportation bag.

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed. Rather, the present disclosure will cover all modifications, equivalents, and alternatives falling within the scope of the present disclosure.

Reference to the invention, the present disclosure, or the like are not intended to restrict or limit the invention, the present disclosure, or the like to exact features or steps of any one or more of the exemplary embodiments disclosed herein. References to "one embodiment," "an embodiment," "alternate embodiments," "some embodiments," and the like, may indicate that the embodiment(s) so described may include a particular feature, structure, or characteristic, but not every embodiment necessarily includes the particular feature, structure, or characteristic.

Any arrangements herein are meant to be illustrative and do not limit the invention's scope. Although specific terms are employed herein, they are used in a generic and descriptive sense only and not for purposes of limitation. Unless otherwise defined herein, such terms are intended to be given their ordinary meaning not inconsistent with that applicable in the relevant industry and without restriction to any specific embodiment hereinafter described.

It will be understood that the steps of any such processes or methods are not limited to being carried out in any particular sequence, arrangement, or with any particular graphics or interface. In fact, the steps of the disclosed processes or methods generally may be carried out in various, different sequences and arrangements while still being in the scope of the present invention. Certain terms are used herein, such as "comprising" and "including," and similar terms are meant to be "open" and not "closed" terms. These terms should be understood as, for example, "including, but not limited to."

As previously described, there is a need for a bag that contains an animal, prevents messes, and provides for easy transportation of the animal. The present invention seeks to solve these and other problems.

Hunting has been around since the beginning of time. However, the means by which dead animals or live animals are transported continues to evolve. For example, some may cut and quarter their harvested animal and place it in a backpack, some may load the animal into a truck or SUV, and others may utilize a UTV or some combination thereof. Often, transporting dead animals with any of these methods, creates a messy condition, with blood and hair being adhered to the surface of the carrying device (e.g., backpack or vehicle). Steps have been taken to remove such messes. Some of these attempts have included utilizing tarps or cloth game bags. The tarps allow blood to run out and are difficult to use due to their size, while cloth game bags may leak and may not keep dust and flies away. Using both of these, or any of the other transportation methods on the market, leads to messes that require additional time to clean.

The animal transportation bag described herein includes an outer covering. Handles are attached to the outer covering of the bag to assist in transportation of an animal. The bag may comprise a fastener so as to open and close the bag, which allows access to an inner compartment where an animal would be placed. An opening may also be positioned on one end of the bag. The opening is configured to receive the neck of an animal. As such, the body of an animal is covered to keep it clean and at the same time blood and hair is prevented from leaving the bag. It will be appreciated that the bag is simple to use, cleans easily, and allows a user to prevent vehicles and animals from becoming dirty. It will further be appreciated that the animal transportation bag may be used for dead animals and/or live animals. For example, fish and game services, veterinarians, ranchers, etc. may need to transport animals from one area to another.

Figure 2:
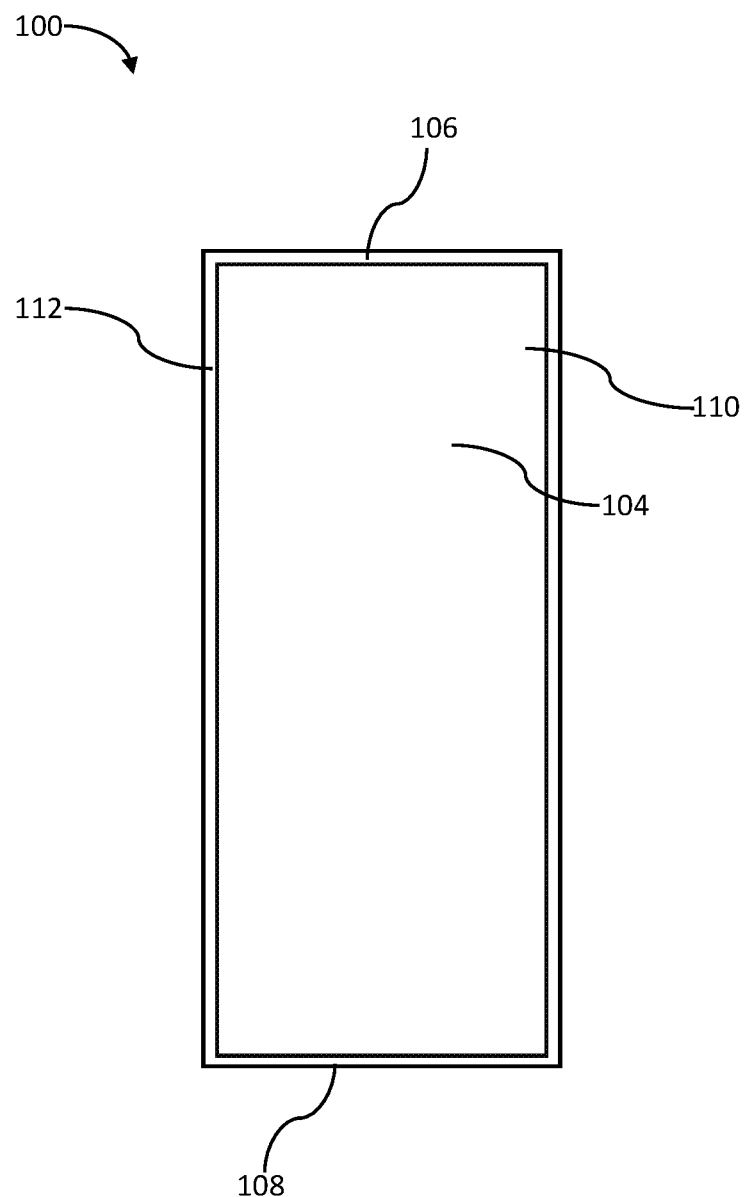
FIG. 2 illustrates a bottom plan view of an animal transportation bag.
Figure 3:
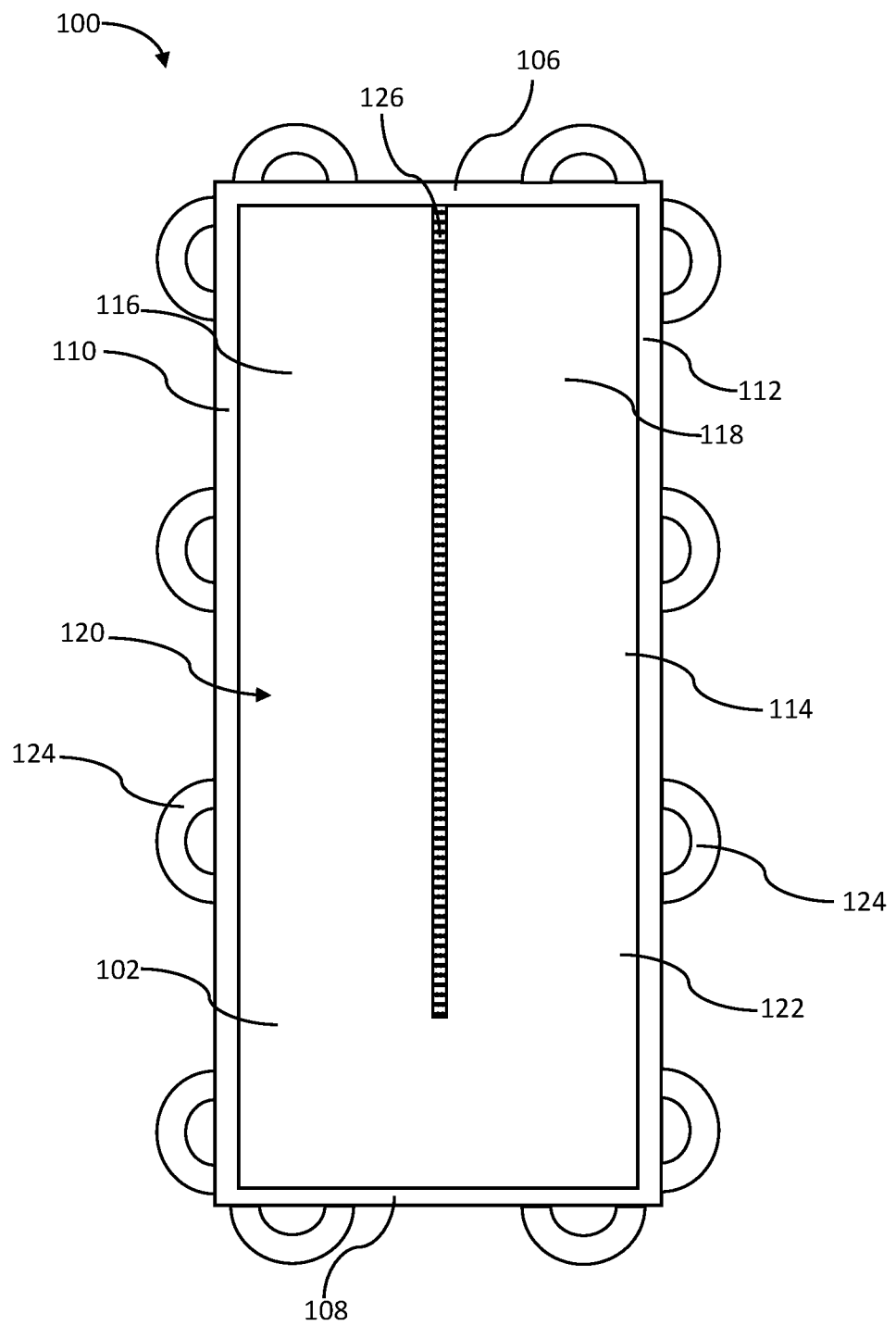
FIG. 3 illustrates a top plan view of an animal transportation bag.

As shown in FIGS. 1-3, in one embodiment, an animal transportation bag 100 (hereinafter referred to as "bag") may comprise an outer covering 102 including a base section 104, a front sidewall 106, a rear sidewall 108, a first sidewall 110, a second sidewall 112, a top section 114 with a first panel 116 and a second panel 118. The outer covering 102 may comprise an outer surface 120. The outer covering 102 may comprise an impervious material. Accordingly, the bag 100 may be manufactured from vinyl, nylon, cordura, PVC, polyester, or any other type of material. In some embodiments, the outer covering 102 may be entirely manufactured from non-impervious material or partially manufactured from non-impervious material. The bag 100 may have seams that are sewn together, sewn and welded, or welded.

In some embodiments, the bag 100 may have different materials on different areas of the bag 100. For example, in some embodiments, the base section 104 may comprise a first material that is thicker than the material on the front sidewall 106, the rear sidewall 108, the first sidewall 110, the second sidewall 112, and the top section 114 so as to resist tearing or other damage from contact with the ground or vehicle. In other embodiments, the entire bag 100 may be manufactured from the same material. In other embodiments, the bag 100 may be manufactured from a disposable and/or biodegradable material. The bag 100 may include a washable material 122 so that the bag may be reused. The bag 100 may be rectangular in shape. While the bag 100 is shown in a rectangular shape, it will be appreciated that the bag 100 may be cuboidal, cylindrical, funnel-shaped, or any other shape. Further, the bag 100 may vary in length and width so as to receive animals of different size, such as ducks, coyote, deer, cows, horses, or moose.

The outer covering 102 may be a variety of colors, such as black, orange, green, or camo. In one embodiment, the bag 100 may be color coded to signify to a user the size (e.g., width, length, and height) thereof. For example, the bag 100 colored in orange may signify a first size that would receive a moose or elk, while the bag colored in green may signify a second size that would receive deer or antelope. Other colors of bags may indicate smaller or larger sizes that may receive smaller or larger animals. Indicia other than color may be used to indicate size of the bag; for example, animal shapes may be printed on the bag 100 to identify the largest animal that may be placed in the bag.

Figure 4A:
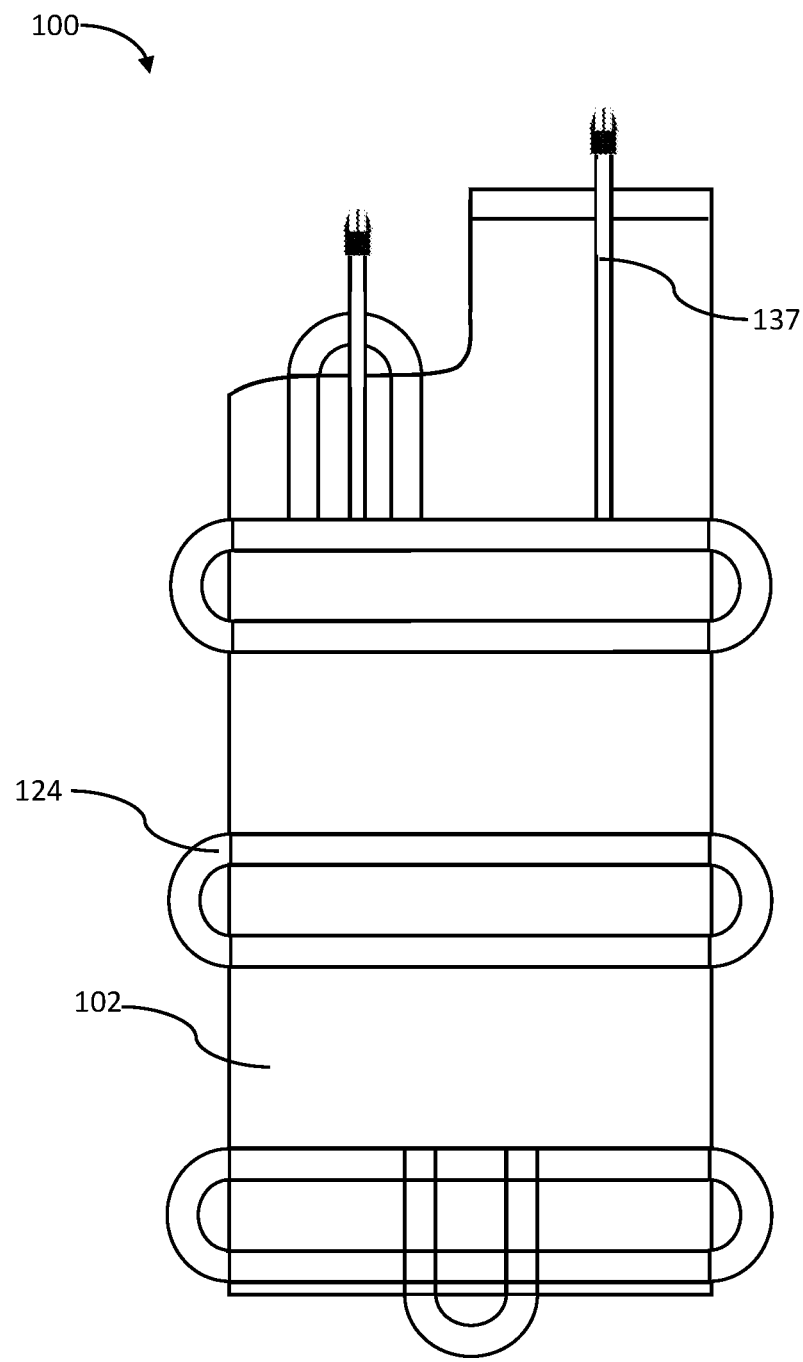
FIG. 4A illustrates a bottom plan view of an animal transportation bag.

The bag 100 may include numerous handles 124 on the front sidewall 106, the rear sidewall 108, the first side wall 110, and/or the second sidewall 112. In some embodiments, as shown in FIG. 4A, handles 124 may be continuous from one side to the other, extending through the bag 100, thereby creating additional strength in the handles 124 and allowing the bag 100 to maintain structural integrity while transporting an animal. It will be understood that the bag 100 may have any number of handles 124. For example, in some embodiments, the bag 100 may have two handles, while in other embodiments, the bag 100 may have more than two handles. The handles 124 may be nylon straps, rope, plastic, rubber, a combination of any of the preceding, or any other type of material. In some embodiments, the handles 124 may be permanently coupled to the bag via welding, sewing, adhesive, etc. Other embodiments may include handles 124 that are removably attachable to the outer surface 102 of the bag 100 via buckles, carabiners, etc.

Figure 5:
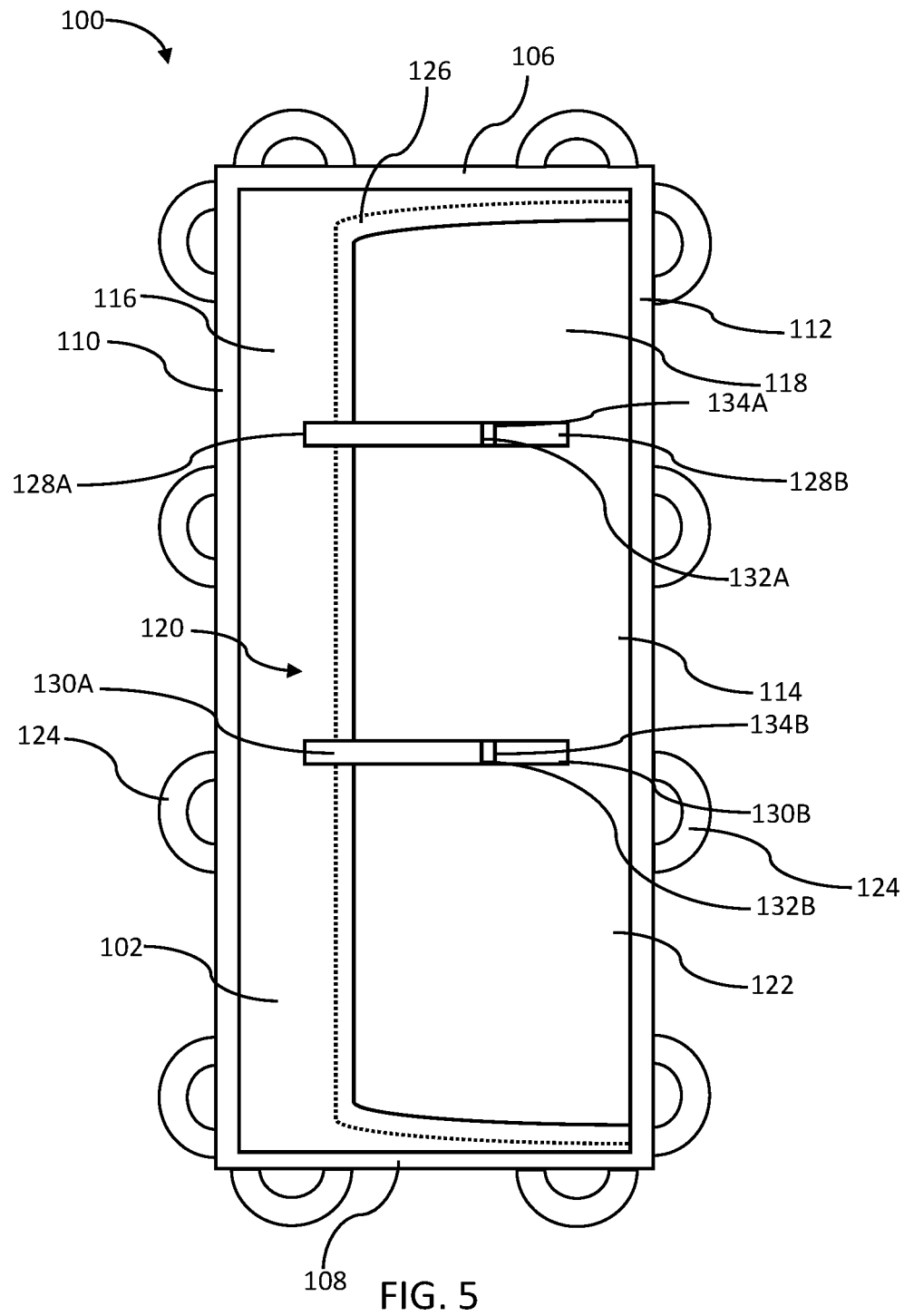
FIG. 5 illustrates a top plan view of an animal transportation bag.

The first panel 116 and second panel 118 may couple to each other via a fastener 126. The first and second panels 116, 118 may be equal in size and shape with the fastener 126 positioned therebetween. In an alternate embodiment, as shown in FIG. 5, the first and second panels 116, 118 may not be equal in size or shape and may be separated by the fastener 126, which is curved. The fastener 126 may be a zipper. The zipper may be a sealed, waterproof zipper that keeps debris or water out of the bag and animal fluids inside the bag 100. In some embodiments, the fastener 126 may comprise hook and loop, magnets, snap fasteners, or any other fastening mechanism that is capable of coupling the first panel 116 to the second panel 118. In some embodiments, a first outer strap 128A may couple to a second outer strap 128B and a third outer strap 130A may couple to a fourth outer strap 130B. The first and second outer straps 128A, 128B and the third and fourth outer straps 130A, 130B may be parallel to each other and spaced apart a first distance (e.g., 24 inches). It will be appreciated the first and second outer straps 128A, 128B and the third and fourth outer straps 130A, 130B may be located in numerous locations on the bag 100, such as positioned at the front sidewall 106. The first and third outer straps 128A, 130A may be coupled to the first panel 116. Both, the first and third outer straps 128A, 130A, may extend from the first panel 116 and couple to the second and fourth outer straps 128B, 130B via a first outer fastener 132A, 132B on the first and third straps 128A, 128B and a second outer fastener 134A, 134B on the second and fourth outer straps 128B, 130B. The second and fourth outer straps 128B, 130B may be coupled to the second panel 118. The first, second, third, and fourth straps 128A, 128B, 130A, 130B may act as additional securement in conjunction with the fastener 126. The first, second, third, and fourth straps 128A, 128B, 130A, 130B may be manufactured from a stretchable or non-stretchable material. The first outer fastener 132A, 132B and the second outer fastener 134A, 134B may include buckles, strap slides, spring buckles, or any other securement mechanism.

Figure 6:
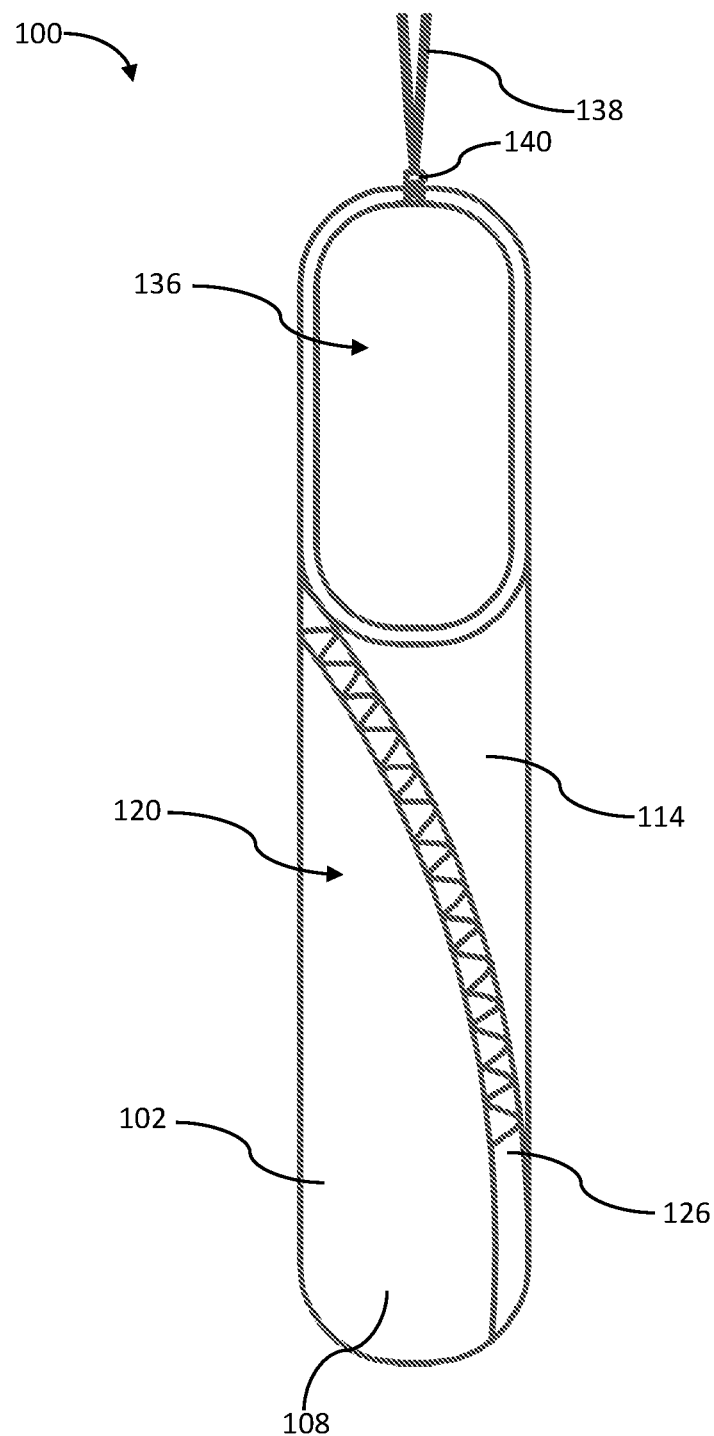
FIG. 6 illustrates a top plan view of an opening of an animal transportation bag.

As illustrated in FIG. 6, in some embodiments, the fastener 126 may begin to fasten at an opening 136 positioned on the front sidewall 106. It will be appreciated that the opening 136 may be positioned at other locations on the bag 100. The fastener 126 may also begin at other positions on the bag 100. The opening 136 may be sized to receive a neck and/or head of an animal. The opening 136 may be circumscribed by an extensible material, such as neoprene rubber or spandex. It will be appreciated that the extensible material can adjust to any size neck, thereby creating a seal around the neck to prevent debris or fluid from entering or exiting the bag. Alternatively, the opening 136 may be circumscribed by a non-extensible material that is capable of receiving numerous neck circumferences. Further, the opening 136 may be circumscribed by a drawstring 138 with a toggle spring-stop 140 so that a user may adjust the opening 136 to the desired circumference.

Figure 4B:
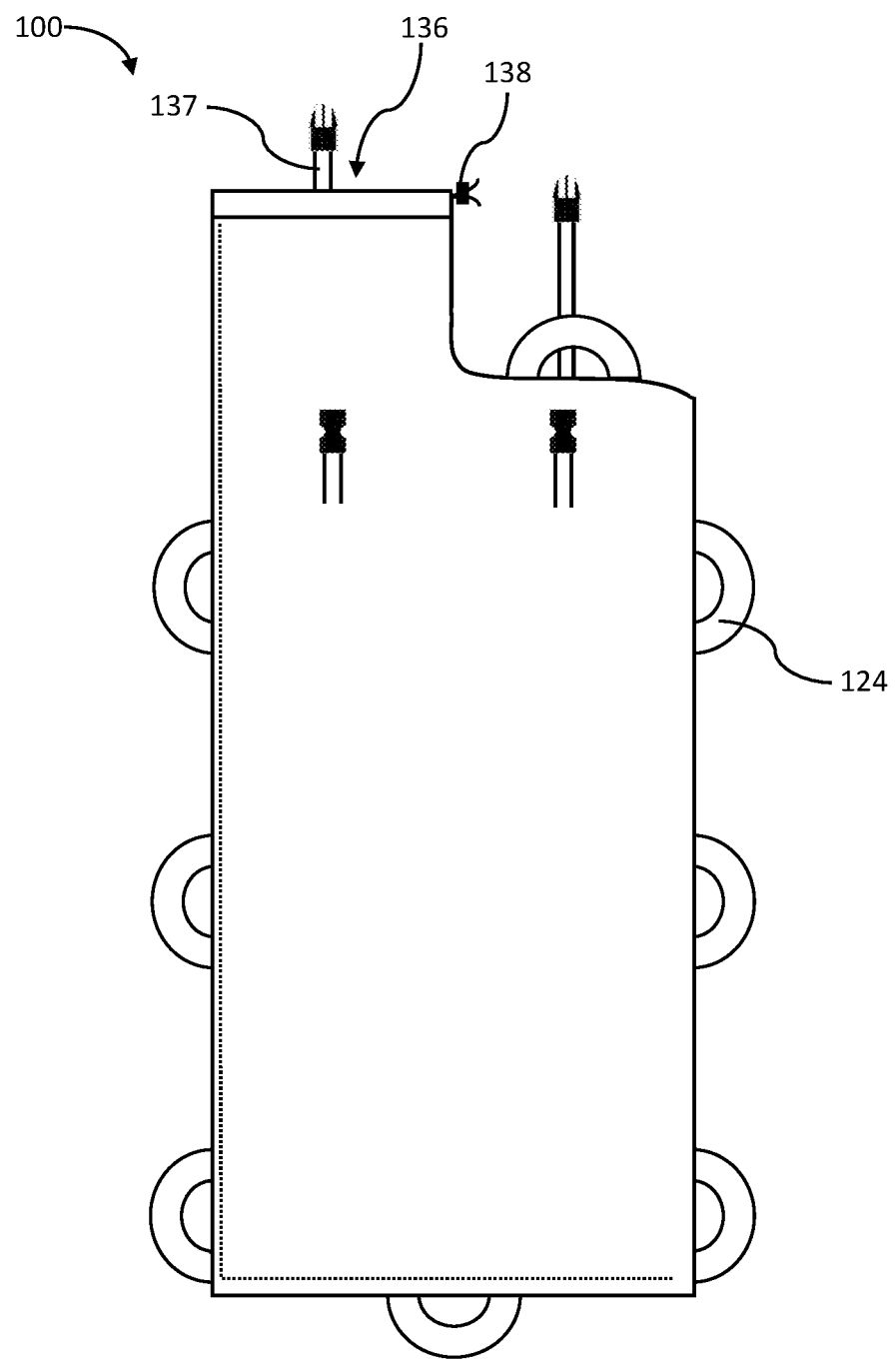
FIG. 4B illustrates a top plan view of an animal transportation bag.

At times, an animal may be placed in the bag 100 after being butchered. Accordingly, the meat of the animal will be placed in the bag 100, thereby leaving the opening 136 unused. The opening 136 may comprise a closure strap 137 (FIG. 4B) that is coupled to one side of the opening 136 or that surrounds the opening 136. The closure strap 137 may comprise a first buckle and a second buckle on opposite sides of the opening 136. The first and second buckles may be coupleable to one another. To use the closure strap, a user would place meat inside the bag and secure the fastener 126 and the straps 128A, 128B, 130A, 130B. The user would then move a first side of the opening 136 toward a second side of the opening 136. Once the first and second sides are touching, the user rolls the straps downward and couples the first and second buckles together so as to seal the opening 136 and protect the meat within the bag. While a roll top design can be used, it will be understood that the opening may be closed via hook and loop, zipper, or any other type of closure mechanism. Being able to open or close the opening 136, allows a user to transport whole animals, quartered animals, or boned out animals.

Figure 7:
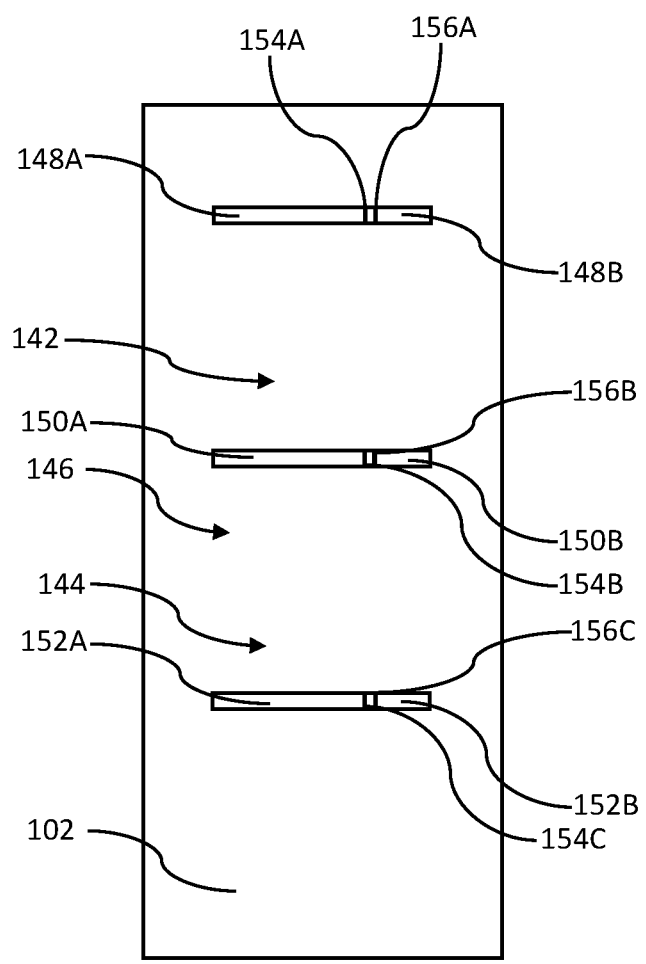
FIG. 7 illustrates a top plan view of an inner compartment of an animal transportation bag.

As shown in FIG. 7, the bag 100 comprises an inner compartment 142 having an inner surface 144. The inner surface 144 may comprise a reusable, washable material, such as vinyl. The reusable material allows a user to wash the inner surface 144 after use. On a lower surface 146 of the inner compartment 142, there may be a first inner strap 148A that couples to a second inner strap 148B, a third inner strap 150A that couples to a fourth inner strap 150B, and a fifth inner strap 152A that couples to a sixth inner strap 152B. The first, third, and fifth straps 148A, 150A, 152A may each comprise a first inner fastener (e.g., male buckles) 154A-154C, and the second, fourth, and sixth straps 148B, 150B, 152B may each comprise a second inner fastener (e.g., female buckles) 156A-156C. In some embodiments, the first inner fastener 154A-154C and the second inner fastener 156A-156C may comprise strap slides, spring buckles, or any other securement mechanism. Once an animal is placed in the inner compartment, the first strap 148A may be placed around the animal and coupled to the second inner strap 148B, likewise the third and fifth straps 150A, 152A may be placed over the animal and coupled to the fourth and sixth straps 150B, 152B, thereby securing the animal to the inner compartment 142. It will be appreciated that the first, second, third, fourth, fifth, and sixth straps 148A, 148B, 150A, 150B, 152A, 152B may be adjustable so as to receive varying body sizes and quarter sizes of an animal. In some embodiments, the first, second, third, fourth, fifth, and sixth straps 148A, 148B, 150A, 150B, 152A, 152B may comprise a stretchable material and/or a non-stretchable material.

In one embodiment, the bag 100 may be removably attachable to a cart. The cart may comprise a battery that attaches to a refrigeration unit. The refrigeration unit may allow the animal and/or meat within the bag to remain cool so that it will not spoil.

Figure 8:
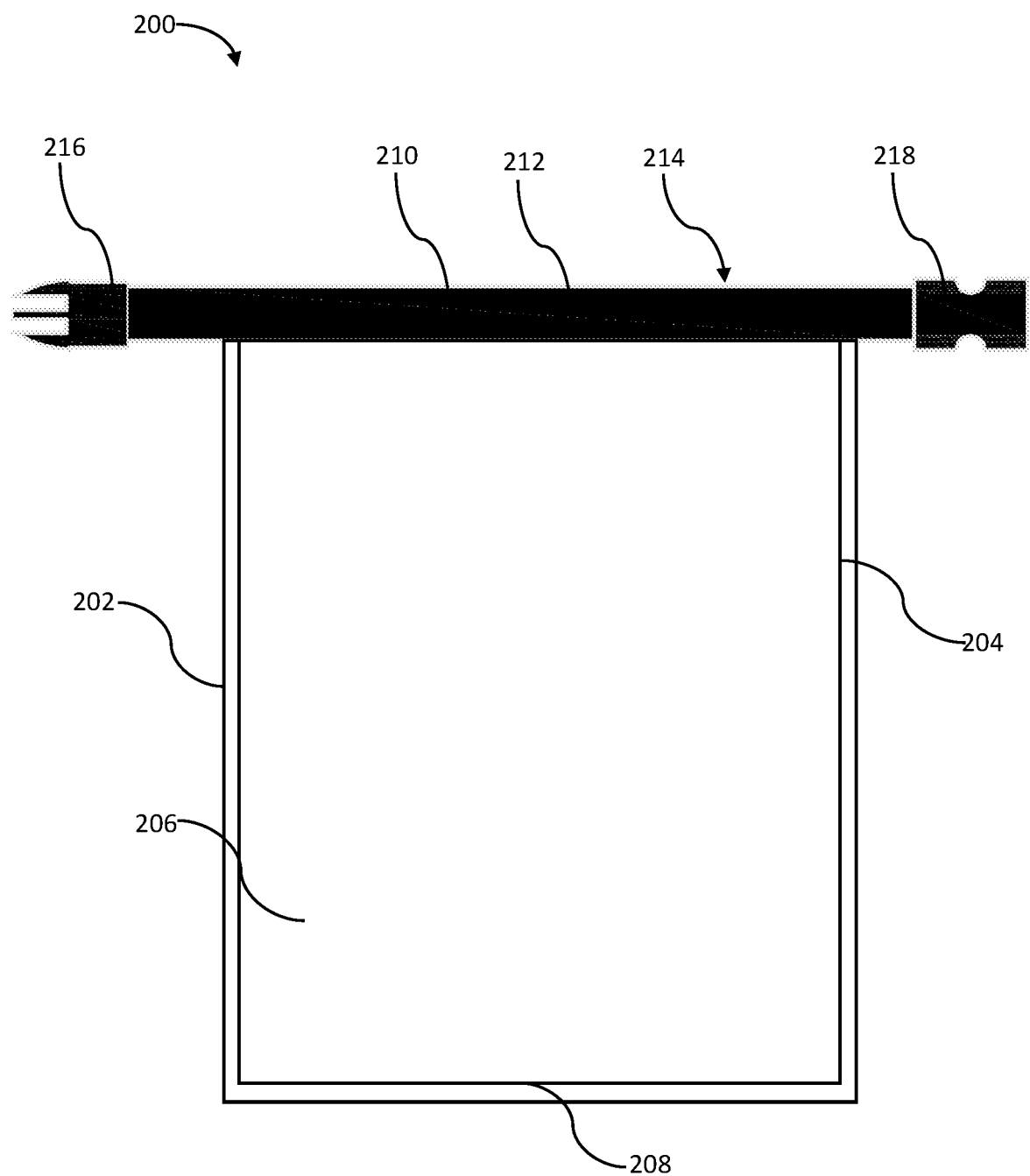
FIG. 8 illustrates a front elevation view of a carrier for an animal transportation bag.

As shown in FIG. 8, a carrier 200 may comprise a first side 202, a second side 204, a back side (not shown, but same as front side), a front side 206, a bottom side 208, and a top side 210. The top side 210 may comprise a strap 212, such as a nylon strap, that may be attached to either side of an opening 214. The strap 212 may comprise a first fastener 216 (e.g., a male buckle) and a second fastener 218 (e.g., a female buckle). To close the opening 214 on the carrier 200, a user would roll the strap 212 downward and couple the first fastener 216 to the second fastener 218. The opening 214 leads to an inner compartment that can hold, for example, ice. The carrier 200 may be placed in the bag 100 so as to keep the animal and/or meat cool during transportation and until processing occurs.

In one embodiment, a method of using an animal transportation bag 100 comprises placing an animal in an inner compartment 142; securing the animal via one or more inner straps 148A, 148B, 150A, 150B, 152A, 152B; placing the animal's neck in an opening 136; securing a fastener 126 to bring a first panel 116 and a second panel 118 together; and transporting the animal via handles 124 on the bag 100.

Figure 9A:
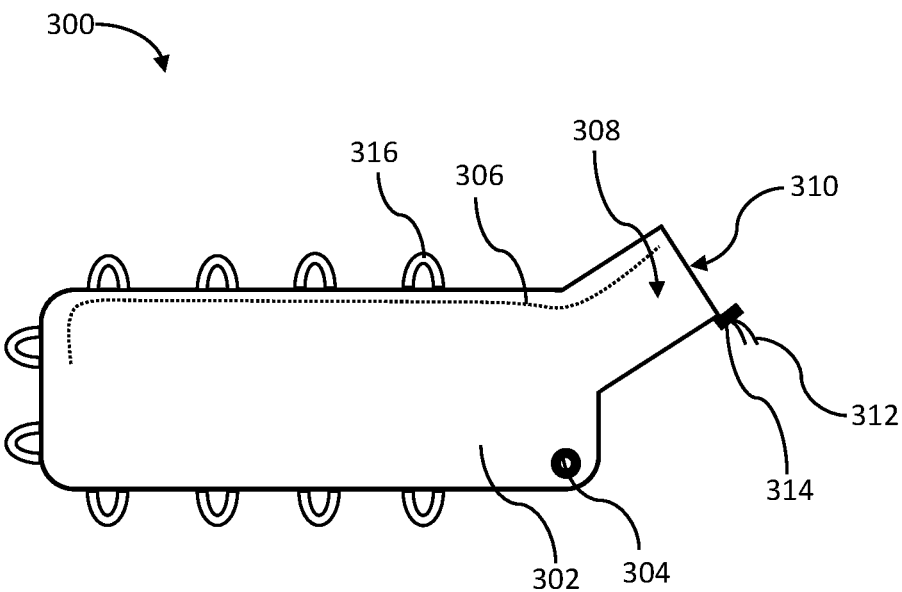
FIG. 9A illustrates a top plan view of an animal transportation bag.
Figure 9B:
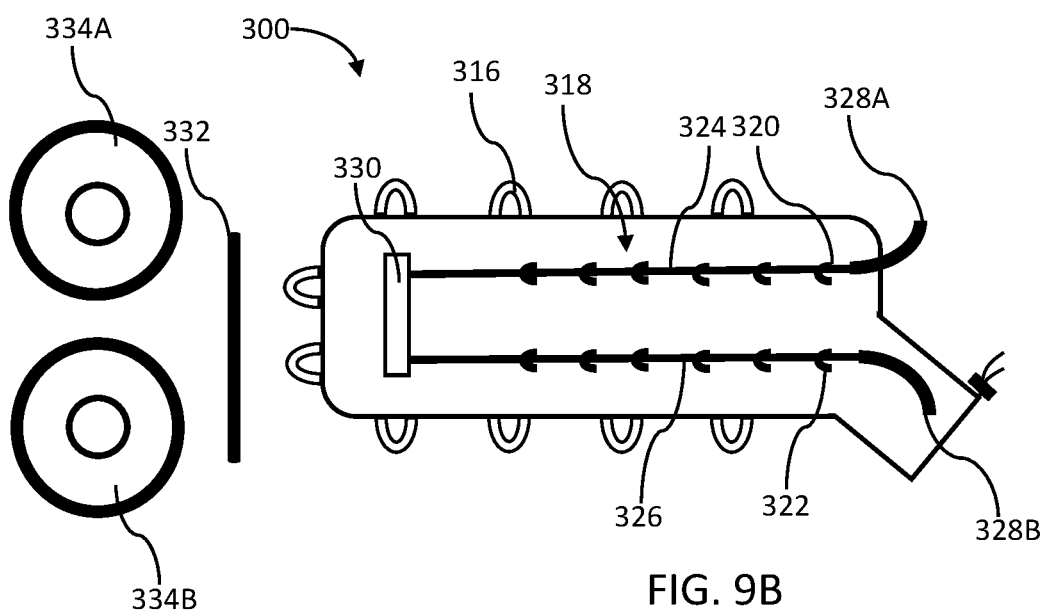
FIG. 9B illustrates a bottom plan view of an animal transportation bag.

In one embodiment, as shown in FIGS. 9A-9B, an animal transportation bag 300 comprises an outer covering 302. The outer covering 302 may comprise a drain plug 304, which may be screwed together or may be coupled via pressure. The drain plug 304 allows water from ice, for example, to drain from the bag 300. The outer surface 302 comprises a fastener 306, such as a zipper. The outer covering may comprise a neck portion 308 that is shaped to mirror the anatomy of a big game animal. That is, the neck portion 308 protrudes slightly upward and outward from the outer covering 302. The neck portion 308 may comprise an opening 310, where the antlers or head and neck may be exposed. The opening 310 may be circumscribed by a drawstring 312 and a toggle spring-stop 314 that allows the opening to close.

In addition, handles 316 may pass through the bag 300 to assist a user in lifting a heavy load. On a bottom side 318, there may be a plurality of first connections 320 and a plurality of second connections 322. The connections 320, 322 may comprise plastic clips, looped material, hook and loop, or any other type of fastener. The plurality of first and second connections 320, 322 may receive a first support bar 324 and a second support bar 326, respectively. The first and second support bars 324, 326 may add rigidity and support to the bag 300. In some embodiments, the first and second support bars 324, 326 may each receive a support handle 328A, 328B. In addition, in one embodiment, the first and second support bars 324, 326 may receive a hitch so as to be coupleable to a vehicle. The outer covering 302 also comprises a sleeve 330 that is configured to receive an axle 332 with wheels 334A, 334B so that a user may easily transport heavy loads.

Figure 10A:
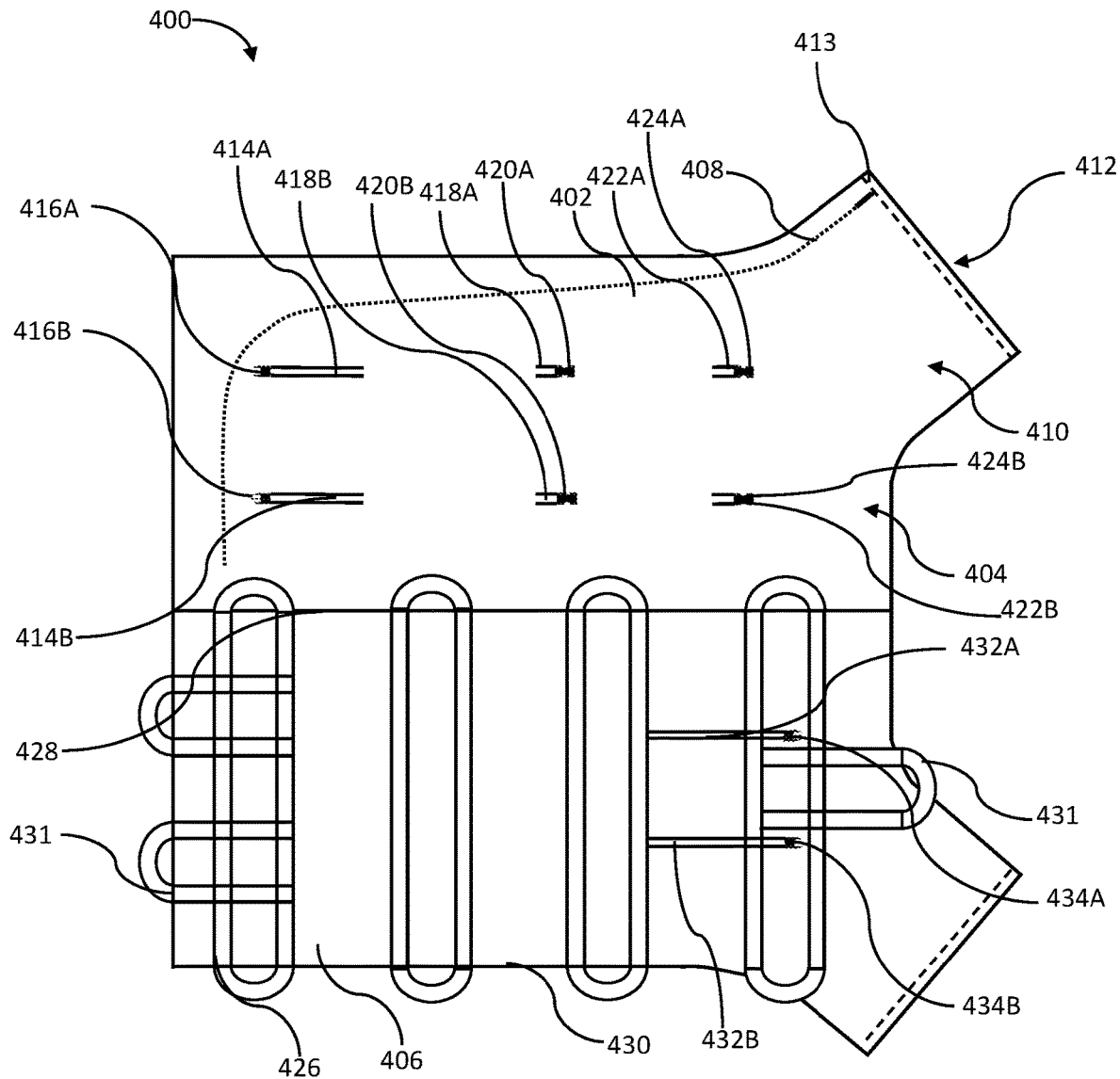
FIG. 10A illustrates a plan view of an animal transportation bag.
Figure 10B:
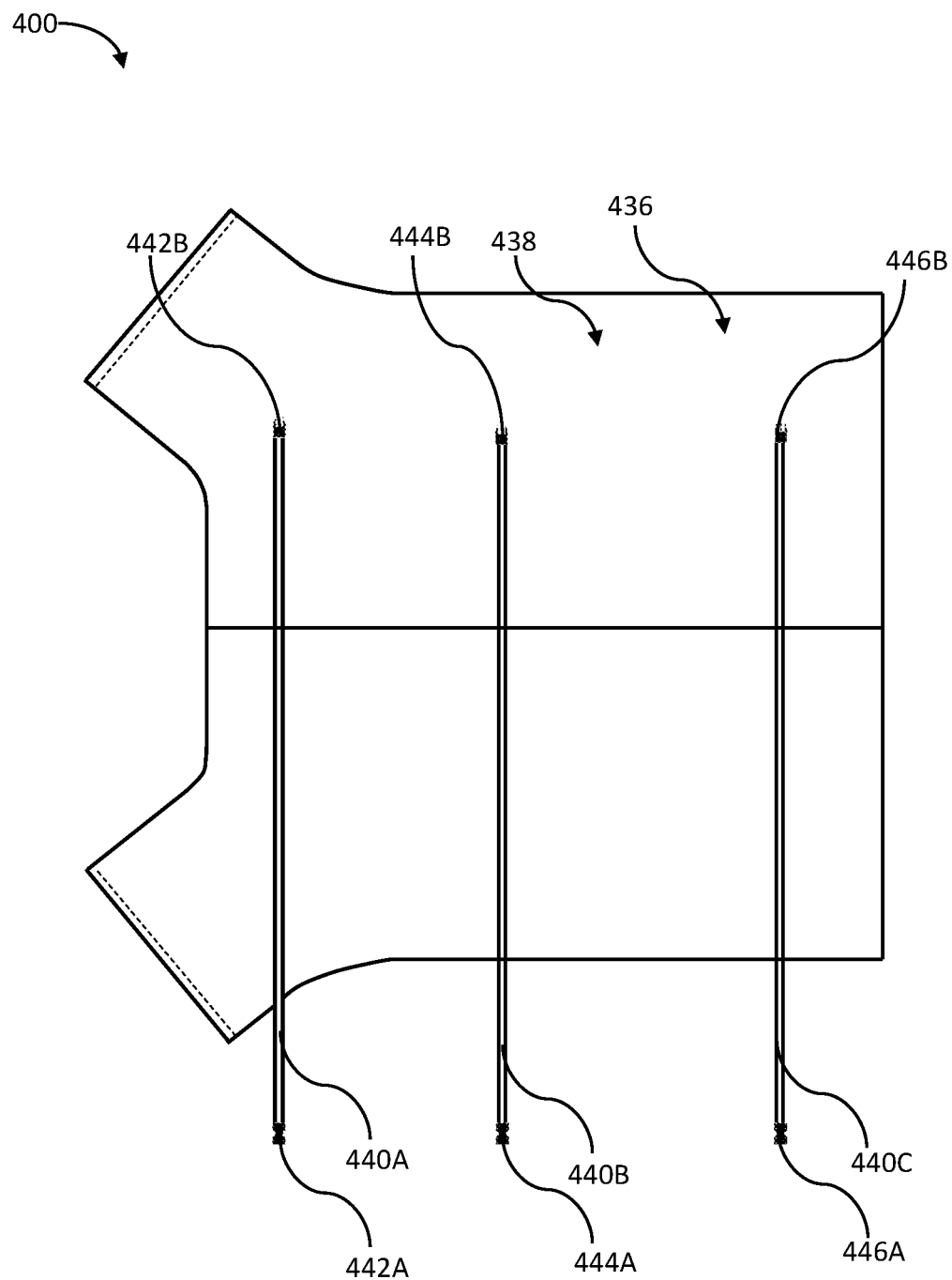
FIG. 10B illustrates a plan view of an inner compartment of an animal transportation bag.

As shown in FIGS. 10A-10B, in one embodiment, an animal transportation bag 400 comprises an outer covering 402. The outer covering 402 may comprise a top section 404 and a bottom section 406. The top section 404 may comprise a fastener 408, such as a zipper. The fastener 406 may curve around a side of the top section 404. In some embodiments, the zipper may be straight, at a slight angle, etc. The outer covering 402 may comprise a neck portion 410 that is shaped to mirror the anatomy of a big game animal and extends outward from the top and bottom sections 404, 406. The neck portion 410 may comprise an opening 412, where the antlers or head and neck may be exposed. The opening 412 may be circumscribed by a drawstring 413 and a toggle spring-stop, as shown in other embodiments herein. The drawstring allows a user to easily adjust the circumference size of the opening 412, thereby allowing numerous animal neck and head sizes to be placed therein. The neck portion 410 may be manufactured out of a stretchable material that can conform to the different shapes and sizes of an animal's neck and head. In other embodiments, the neck portion may be manufactured out of a non-stretchable material.

Furthermore, the top section 404 may comprise a first set of straps 414A, 414B with first couplers 416A, 416B (e.g., male buckles). A second set of straps 418A, 418B with second couplers 420A, 420B (e.g., female buckles) may also be coupled to the top section 404. The top section 404 may also comprise a third set of straps 422A, 422B with third couplers 424A, 424B (e.g., female buckles). The first, second, and third set of straps 414A, 414B, 418A, 418B, 420A, 420B may be sewn or welded to the outer covering 402, or fastened thereto via other fastening mechanisms. The first, second, and third set of straps 414A, 414B, 418A, 418B, 420A, 420B may be manufactured from a nylon webbing, rubber, etc.

In addition, the bottom section 406 may comprise first handles 426, which may pass through the bag 400 from a first side 428 to a second side 430 to assist a user in lifting a heavy load. The bottom section 406 may also comprise second handles 431 which may be coupled to the bottom section 406 and/or the first handles 426. The second handles 431 may be perpendicular to the first handles 426. The handles 426 may be coupled to the bag 400 via sewing, welding, buckles, a combination thereof, or any other coupling mechanism. In some embodiments, the handles 426 may not pass through or underneath the bag from the first side 428 to the second side 430, but be coupled to the first and/or second side. The handles 426 may be manufactured from a nylon strap, rubber, plastic, or any other material that is capable of being a handle. Furthermore, the bottom section 406 may comprise a fourth set of straps 432A, 432B with fourth couplers 434A, 434B. The fourth couplers 434A, 434B may be coupled to the third couplers 424A, 424B after the neck portion 410 is folded, thereby sealing the opening 412. Additionally, the second couplers 420A, 420B may couple to the first couplers 416A, 416B so as to create more handles or secure loads on the outside of the bag 400.

As illustrated in FIG. 10B, an inner compartment 436 may comprise an inner surface 438. The inner surface 438 may be an impervious material so as to prevent fluid from escaping the bag 400. It will be appreciated that the seams of the bag 400 may be sewn and/or welded to further prevent fluid from escaping the bag 400. The inner compartment 436 may comprise a first inner strap 440A, a second inner strap 440B, and a third inner strap 440C coupled thereto via sewing, welding, a combination thereof, or any other coupling mechanism. The first inner strap 440A may comprise a first female coupler 442A (e.g., a buckle) and a first male coupler 442B (e.g., a buckle), both of which are configured to be coupled together. The second inner strap 440B may comprise a second female coupler 444A (e.g., a buckle) and a second male coupler 444B (e.g., a buckle). The third inner strap 440C may comprise a third female coupler 446A (e.g., a buckle) and a third male coupler 446B (e.g., a buckle). It will be understood that the first, second, and third inner straps 440A-440C may comprise camlock lever buckles or any other type of coupling mechanism. It will further be understood that while three straps are shown in the inner compartment 436, any number of straps may be utilized, or, in some cases, no straps may be present.

Figure 11A:
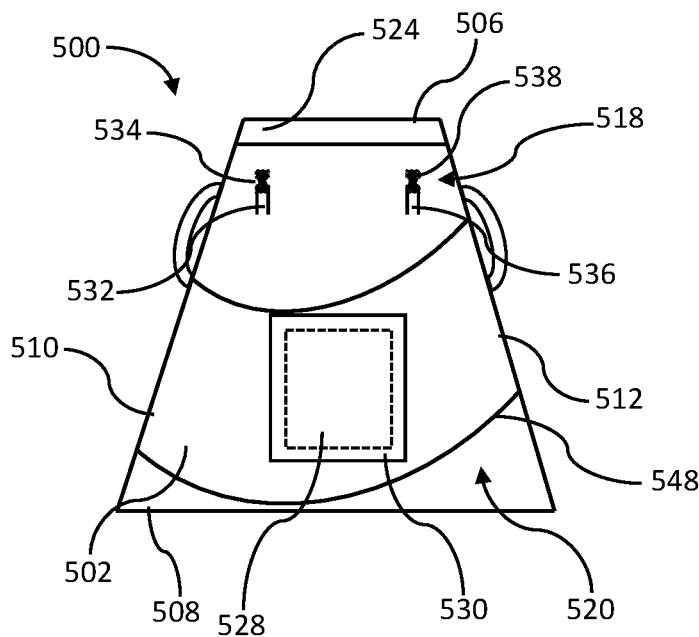
FIG. 11A illustrates a front elevation view of an animal transportation bag.
Figure 11B:
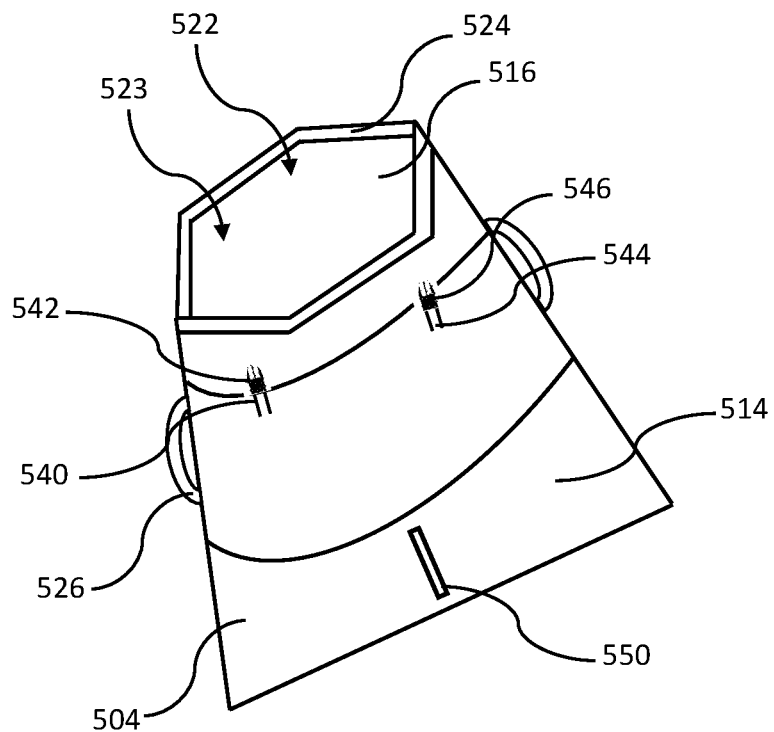
FIG. 11B illustrates a top perspective view of an animal transportation bag.

As shown in FIGS. 11A-11B, in one embodiment, an animal transportation bag 500 may comprise a front 502, a back 504, a top 506, a bottom 508, a first side 510, and a second side 512. The animal transportation bag 500 may comprise a first layer 514 and a second layer 516. The first and second layers 514, 516 may be manufactured from the same material or may be manufactured from different types of material. For example, the first layer 514 and/or the second layer 516 may be manufactured from cordura, nylon, polyester, vinyl, or any other type of material. In some embodiments, the first layer 514 and/or the second layer 516 may be manufactured from an impervious material. In other embodiments, the first layer 514 and/or the second layer 516 may be manufactured from a breathable, non-impervious material. In some embodiments, the first layer 514 and/or second layer 516 may be a combination of impervious and non-impervious material.

The animal transportation bag 500 may comprise a neck portion 518 that leads to a body portion 520. The neck portion 518 may comprise an opening 522 that allows access to an interior compartment 523 of the animal transportation bag 500. The opening 522 of the animal transportation bag 500 may be circumscribed by a first frame 524, such as a hexagonal frame with hinges. The first frame 524 may be easily opened and held in an open position due to hinges on the first frame 524. In addition, the first frame 524 may be easily closed by pushing one side of the first frame 524 towards another. The animal transportation bag 500 may be used for snakes or other dangerous animals where quick and easy closure of the first frame 524 helps protect a user. In some embodiments, the first frame 524 may be a two-piece frame, such as a purse frame with or without a ball and clasp. It will be appreciated that the first frame 524 may allow a user to operate it using one hand or another object. The first frame 524 may be positioned in the first layer and/or second layer. In some embodiments, the first frame 524 may be coupled to the opening 522, outside of the first layer 514 and/or second layer 516 via welding, sewing, a combination thereof, or any other type of coupling mechanism.

Further, the animal transportation bag 500 may comprise one or more handles 526 on the first or second sides 510, 512 or on the front 502, back 504, top 506, or bottom 508 so as to make it easily transportable by a user. The handles 526 may be made of the same material as the first and second layers 514, 516 or may be made of rubber, plastic, or any other material.

The front 502 of the animal transportation bag 500 may comprise a window 528. The window 528 may be vinyl, mesh, or other types of transparent material. The window 528 may be sewn, welded, or coupled to the animal transportation bag 500 by any other securement means. The window 528 may be of any shape. For example, the window 528 may be a quadrangle, triangle, or any other shape. It will be appreciated that the window 528 may be located anywhere on the animal transportation bag 500 and be of any size. In some embodiments, the window 528 may be covered by a window cover 530. The window cover 530 may be manufactured from vinyl, cordura, polyester, or any other material. The window cover 530 may be removably attachable to the animal transportation bag 500. In some embodiments, the window cover 530 may be hingedly coupled, or in other words, one side of the window cover 530 may be coupled to the animal transportation bag 500 so that a user can lift it to view the window 528 (e.g., a flap) and the animal or creature therein.

Further, the front 502 of the animal transportation bag 500 may further comprise a first strap 532 with a first fastener 534, the first strap 532 coupled to the animal transportation bag 500 and a second strap 536 with a second fastener 538, the second strap 536 coupled to the animal transportation bag 500. The first fastener 534 and second fastener 538 may be buckles. Other first and second fasteners 534, 538 may include latches, hook and loop, or any other fastening mechanism. The back 504 of the animal transportation bag 500 may comprise a third strap 540 with a third fastener 542, the third strap 540 coupled to the animal transportation bag 500 and a fourth strap 544 with a fourth fastener 546, the fourth strap 544 coupled to the animal transportation bag 500. The third fastener 542 and fourth fastener 546 may be buckles. Other third and fourth fasteners 542, 546 may include latches, hook and loop, or any other fastening mechanism. The first, second, third, and fourth buckles 534, 538, 542, 546 may be utilized after a user folds the opening 524 down towards the bottom 508 of the animal transportation bag 500. Then the first fastener 534 may couple to the fourth fastener 546 and the second fastener 538 may couple to the third fastener 542, thereby sealing the animal transportation bag 500.

The animal transportation bag 500 may further comprise a second frame 548. The second frame 548 may be positioned or wrap around the circumference of the animal transportation bag 500 from the bottom 508 to the top 506. That is, the second frame 548 may comprise wire acting as a spring for the animal transportation bag 500 (e.g., a coil spring). The second frame 548 may add rigidity to the animal transportation bag 500, thereby allowing the animal transportation bag 500 to stand erect on its own. Due to the configuration of the second frame 548, the second frame 548 may be collapsible, thereby allowing the top 506 to contact and be secured to the bottom 508 via, for example, a bag fastener 550. The second frame 548 may be coupled to the first layer 514 and/or second layer 516 via sewing, welding, or other coupling mechanisms. It will be appreciated that once the animal transportation bag 500 is collapsed a user may easily transport and store the bag 500.

It will be appreciated that the bag 100, 300, 400, 500 allows an animal to be easily transported while keeping it cool and clean. The bag 100, 300, 400, 500 may be used numerous times and in a variety of situations. For example, the bag 100, 300, 400, 500 may be used to not only carry animals and meat, but may also be used to carry gear. The bag 100, 300, 400, 500 may be used to carry live animals by veterinarians and fish and game or may be used to carry the carcass of a downed animal. In addition, in some embodiments, the bag 100, 300, 400, 500 may receive disposable, insulated liners to keep game meat and big game animals cool. In some embodiments, the bag 100, 300, 400 may comprise a battery plug in heat exchanger with cooling tubes throughout the bag. Further, in some embodiments, the bag 100, 300, 400, 500 may comprise removably attachable shoulder straps so as to turn the bag 100, 300, 400 into a pack to carry loads.

It will be understood that while various embodiments have been disclosed herein, other embodiments are contemplated. Further, systems and/or methods according to certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated.

As such, other embodiments can also include said features, components, members, elements, parts, and/or portions without necessarily departing from the scope of the present disclosure.

The embodiments described herein are examples of the present disclosure. Accordingly, unless a feature or component is described as requiring another feature or component in combination therewith, any feature herein may be combined with any other feature of a same or different embodiment disclosed herein. Although only a few of the example embodiments have been described in detail herein, those skilled in the art will appreciate that modifications are possible without materially departing from the present disclosure described herein. Accordingly, all modifications may be included within the scope of this invention.

What is claimed is:

1. An animal transportation bag comprising:
   a top section comprising a plurality of straps and a plurality of couplers;
   a bottom section comprising one or more handles;
   an inner compartment comprising a plurality of inner straps including a plurality of inner couplers,
   a fastener that couples the top section to the bottom section;
   a first neck portion that extends upward and away from the top section;
   a second neck portion that extends upward and away from the bottom section;
   an opening between the first and the second neck portions that is formed when the top section is coupled to the bottom section;
   wherein the opening is capable of changing circumference size by a drawstring that circumscribes the opening and a toggle-spring stop;
   wherein when the circumference of the opening is in an opened or contracted position and the animal transportation bag is to be sealed, the first and second neck portions roll in a downward direction toward the top and bottom sections and one or more of the plurality of straps and the plurality of couplers are fastened to seal the opening;
   wherein the opening comprises a stretchable material.

2. The animal transportation bag of claim 1, wherein the plurality of straps comprises a first set of straps, a second set of straps, and a third set of straps.

3. The animal transportation bag of claim 2, wherein the first set of straps comprises first couplers, the second set of straps comprises second couplers, and the third set of straps comprises third couplers.

4. The animal transportation bag of claim 1, wherein the bottom section comprises a fourth set of straps.

5. The animal transportation bag of claim 4, wherein the fourth set of straps comprises fourth couplers.

6. The animal transportation bag of claim 1, wherein the plurality of inner straps comprises a first inner strap, a second inner strap, and a third inner strap.

7. The animal transportation bag of claim 1, wherein the fastener comprises a zipper.

8. The animal transportation bag of claim 1, wherein the one or more handles comprise first handles and second handles.

9. The animal transportation bag of claim 8, wherein the second handles are coupled to the first handles.

10. The animal transportation bag of claim 1, further comprising a drain plug on the top section.

11. The animal transportation bag of claim 1, further comprising a plurality of first connections and a plurality of second connections that receive a first support bar and a second support bar.

12. The animal transportation bag of claim 11, wherein the first support bar and the second support bar each comprise a support handle.

13. An animal transportation bag comprising:
   a top section comprising:
      a first set of straps comprising first couplers,
      a second set of straps comprising second couplers, and
      a third set of straps comprising third couplers;
   a bottom section comprising:
      first handles extending from a first side of the bottom section to a second side of the bottom section,
      second handles perpendicular to the first handles, and
      a fourth set of straps with fourth couplers;
   an inner compartment comprising:
      a first inner strap comprising a first female buckle and a first male buckle, a second inner strap comprising a second female buckle and a second male buckle, and
      a third inner strap comprising a third female buckle and a third male buckle;
   a fastener that couples the top section to the bottom section;
   a first neck portion that extends upward and away from the top section;
   a second neck portion that extends upward and away from the bottom section;
   an opening between the first and the second neck portions that is formed when the top section is coupled to the bottom section;
   wherein when the circumference of the opening is in an opened or contracted position and the animal transportation bag is to be sealed, the first and second neck portions roll in a downward direction toward the top and bottom sections, and the third couplers on the third set of straps are coupled to the fourth couplers of the fourth set of straps to seal the opening;
wherein the second handles are coupled to the first handles;
wherein the opening is capable of changing circumference size by a drawstring that circumscribes the opening and a toggle-spring stop.

14. The animal transportation bag of claim 13, wherein the animal transportation bag comprises an impervious, insulated material and welded seams.

15. An animal transportation bag comprising:
a top section comprising:
　a first set of straps comprising first couplers,
　a second set of straps comprising second couplers, and
　a third set of straps comprising third couplers;
a bottom section comprising:
　first handles extending from a first side of the bottom section to a second side of the bottom section,
　second handles perpendicular to the first handles and coupled to the first handles, and a fourth set of straps with fourth couplers. fourth couplers;
an inner compartment comprising:
　a first inner strap comprising a first female buckle and a first male buckle,
　a second inner strap comprising a second female buckle and a second male buckle, and
　a third inner strap comprising a third female buckle and a third male buckle;
a zipper that couples the top section to the bottom section;
a first neck portion that extends upward and away from the top section;
a second neck portion that extends upward and away from the bottom section;
an opening between the first and the second neck portions that is formed when the top section is coupled to the bottom section;
a draw string circumscribing the opening of the neck portion;
a drain plug;
wherein the bottom section comprises a sleeve that is configured to receive an axle with wheels;
wherein the opening comprises a stretchable material;
　wherein the first and second neck portions comprises a first neck portion and a second neck portion that roll in a downward direction toward the top and bottom sections;
　wherein when the first and second neck portions with the opening are rolled, third couplers on the third set of straps are coupled to the fourth couplers of the fourth set of straps and the opening is sealed; and
　wherein seams on the top section and the bottom section are welded to prevent fluid from escaping.

16. The animal transportation bag of claim 15, further comprising a plurality of first connections and a plurality of second connections that receive a first support bar and a second support bar.

17. The animal transportation bag of claim 16, wherein the first and second support bars receive a hitch that is couplable to a vehicle.

* * * * *